United States Patent [19]

Draghi et al.

[11] Patent Number: 4,726,101

[45] Date of Patent: Feb. 23, 1988

[54] TURBINE VANE NOZZLE RECLASSIFICATION

[75] Inventors: Peter J. Draghi, Windsor Locks; John P. Arrigoni, Wallingford, both of Conn.

[73] Assignee: United Technologies Corporation, Hartford, Conn.

[21] Appl. No.: 911,681

[22] Filed: Sep. 25, 1986

[51] Int. Cl.⁴ .................. B21K 3/04; B23P 15/04; B23P 6/00

[52] U.S. Cl. .................. 29/156.8 B; 29/402.06; 29/402.07; 29/402.08; 29/402.11; 29/402.13; 29/402.16; 29/402.09; 29/402.21; 228/119; 228/194; 228/248; 403/272; 416/229 A; 416/241 R

[58] Field of Search .......... 29/157 C, 156.8 B, 402.06, 29/402.07, 402.08, 402.09, 402.11, 402.13, 402.16, 402.21; 228/119, 194, 248; 403/270, 271, 272; 165/76; 416/241 R, 229 A; 137/97, 98, 99

[56] References Cited

U.S. PATENT DOCUMENTS

| | | |
|---|---|---|
| 729,154 | 5/1903 | Gausden . |
| 2,366,164 | 1/1945 | Weick et al. ................ 113/112 |
| 2,504,509 | 4/1950 | Erickson ................ 113/112 |
| 2,694,458 | 11/1954 | Stevens ................ 170/159 |
| 2,924,546 | 2/1960 | Shaw ................ 138/99 X |
| 2,929,755 | 3/1960 | Porter ................ 154/90 |
| 3,296,886 | 1/1967 | Reinhart, Jr. ................ 74/572 |
| 3,358,898 | 12/1967 | Medkeff et al. ................ 138/99 X |
| 3,528,200 | 9/1970 | Allen et al. ................ 51/143 |
| 3,548,481 | 12/1970 | Bohn et al. ................ 29/401 |
| 3,678,570 | 7/1972 | Paulonis et al. ................ 29/498 |
| 3,886,647 | 6/1975 | Alexander ................ 416/241 X |
| 4,004,047 | 1/1977 | Grisik ................ 427/142 |
| 4,005,988 | 2/1977 | Paulonis et al. ................ 29/194 |
| 4,028,787 | 6/1977 | Cretella et al. ................ 29/156.8 B |
| 4,050,133 | 9/1977 | Cretella et al. ................ 29/402.21 X |
| 4,073,639 | 2/1978 | Duvall et al. ................ 75/0.52 |
| 4,098,450 | 7/1978 | Keller et al. ................ 29/402.21 X |
| 4,141,127 | 2/1979 | Cretella et al. ................ 29/156.8 B |
| 4,161,056 | 7/1979 | Dunham ................ 29/402 |
| 4,164,061 | 8/1979 | Bronovsky et al. ................ 29/156.8 B |
| 4,176,433 | 12/1979 | Lee et al. ................ 29/156.8 B |
| 4,409,054 | 10/1983 | Ryan ................ 156/293 |
| 4,426,193 | 1/1984 | Carlson ................ 416/229 A |

Primary Examiner—Howard N. Goldberg
Assistant Examiner—Ronald S. Wallace
Attorney, Agent, or Firm—William J. Sapone

[57] ABSTRACT

A gas turbine vane (1) is subject to distortion and wear during operation or repair which results in an increase in the spacing between successive vanes (6 and 7) which define nozzle gas flow areas (8 and 9). During refurbishment, the nozzle spacing must be returned to the original dimension to insure optimum turbine performance. A build up of alloy in the wear area is accomplished by controllably applying layers of a tape (12) of uniform thickness to the vane. The tape includes a mixture of a binder and an alloy powder, which is compatible with the substrate alloy, with the mixture formed into a sheet of uniform thickness and having an adhesive backing. After applying the tape in layers to a desired thickness, the vane is heated to a temperature at which the binder and adhesive decompose and the alloy in the tape diffusion bonds with the substrate alloy. Utilization of this process reduces the cost of refurbishing used turbine vanes and avoids hot forming or bending processes which could damage the vanes.

10 Claims, 1 Drawing Figure

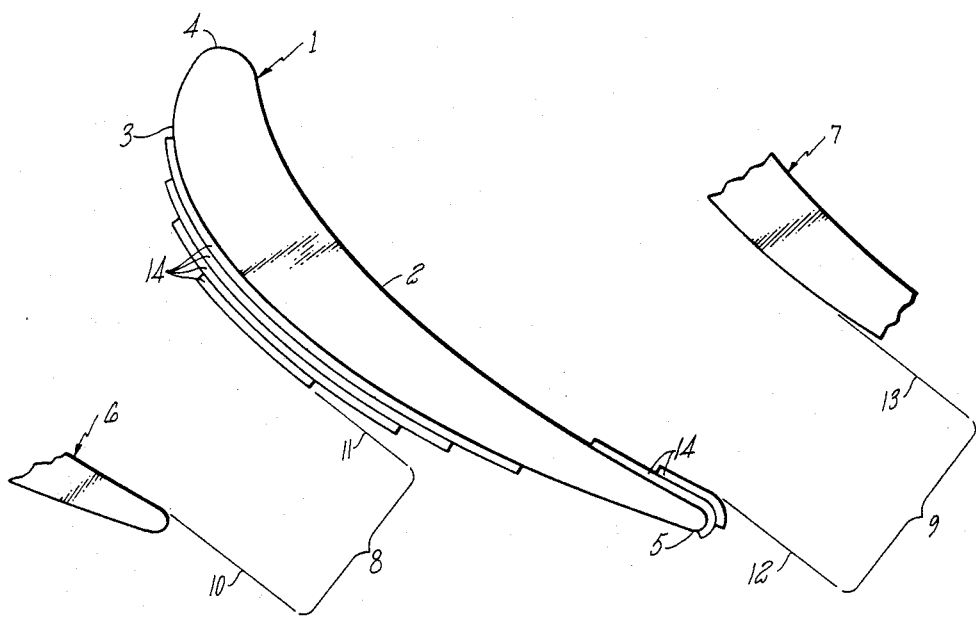

TURBINE VANE NOZZLE RECLASSIFICATION

DESCRIPTION

1. Technical Field

This invention relates to gas turbine engine components, and more particularly, to a method of reclassifying the nozzle area between adjacent turbine vanes.

2. Background Art

A gas turbine engine includes a compressor section, a combustion section, and a turbine section. Disposed within the turbine section are alternating rows of rotatable blades and static vanes. As hot combustion gases pass through the turbine section, the blades are rotatably driven, turning a shaft and thereby providing shaft work for driving the compressor section and other auxiliary systems. The higher the gas temperature, the more work that can be extracted in the turbine section and the greater the overall efficiency. In order to increase the turbine section operating temperature capability, cobalt and nickel base superalloy materials are used to produce the turbine airfoil blades and vanes. Such materials maintain mechanical strength at high temperatures.

The stationary vanes, disposed between the rows of rotating blades, stabilize and direct the gas flow from one row of rotating turbine blades to the next row, with a nozzle area defined by the spacing between the adjacent vanes. Such gas flow stabilization optimizes the amount of work extracted in the turbine section. Generally, the nozzle flow areas are assigned classification numbers which are correlated to the volumetric gas flow, allowing comparison of flow properties between vanes of complex geometry. The nozzle area is therefore defined for convenience in terms of a class size. For example, in a particular model engine, a class 27 nozzle has an open area of 1.868–1.894 square inches, while a class 29 nozzle has an open area of 1.919–1.944 square inches, regardless of geometry.

In service, deterioration of the vane surface occurs due to oxidation and metal erosion caused by abrasives and corrosives in the flowing gas stream impinging on the vane. In addition, the high gas loadings at high temperature promote distortion of the vanes, thereby enlarging the nozzle area, with a consequent loss in turbine efficiency. During a periodic engine overhaul, the vanes are inspected for physical damage and evaluated to determine the degree of flow area change and the effect on nozzle classification. Before such vanes can be returned to the engine, any eroded material must be replaced and the vanes otherwise reclassified. In addition, any vanes which suffer a loss of metal or a change in shape due to coating removal or repair must be reclassified.

Several methods exist for modifying a vane to return the nozzle gas flow area to the original classification (reclassifying). One method involves hot striking or otherwise bending the trailing edge of the vane, narrowing the gap between adjacent vanes. However, such bending introduces stresses which may produce cracks in the vane. Such bending may also cause excessive distortion of the vane, preventing the proper fit and seal of the internal cooling tubes, while the fixturing devices, which hold the vanes during bending, may distort the vane platform or crush the vane pedestal. Even if bending stresses can be reduced, several high temperature alloys used in gas turbine engines cannot be hot formed or bent due to the deleterious effects on material properties such as fatigue strength. Since the bending process does not return metal to the vane surface, there is no strength contribution and the vane is structurally weaker than a new vane would be, limiting the useful life of the vane.

Another method for reclassifying turbine vanes involves addition of an alloy to the deteriorated vane surface by a combined weld/plasma spray process, such as that described in U.S. Pat. No. 4,028,787 to Cretella et al. This process requires the addition of weld beads to the worn surface for reinforcement, with a number of plasma sprayed layers of the alloy then added to achieve the proper alloy thickness. This procedure is very labor intensive requiring a welder to add a number of weld beads to a small surface, clean the vane, and then add a number of plasma spray layers. In addition, the vane may be damaged due to the thermal stresses involved in the welding operation.

Another problem with the weld/plasma spray process involves the specific area of deterioration. It is to be expected that deterioration will be more severe at the narrowest nozzle dimension where the velocity of the gas flow is highest. During the plasma spray process, alloy is added to the surface in very thin layers, forming a broad even pattern. After completion of the plasma spray, the excess material must be removed from non-eroded areas of the vane. If the deterioration is severe in a specific area, numerous layers of the alloy must be added and much of it removed from the non-eroded areas. Such a procedure is time consuming and wasteful of the alloy materials involved. Consequently, a need has arisen for a method of reclassifying turbine vanes which provides addition of an alloy to a specific area while minimizing costs.

DISCLOSURE OF INVENTION

It is an object of the present invention to provide a simplified method for adding a controlled amount of an alloy to a specific area of an article.

It is a further object of the present invention to provide a method for reclassifying turbine vanes which reduces the amount of labor required to provide a build up of an alloy at a specific location on the turbine vane surface.

It is a further object of the present invention to provide a method of reclassifying turbine vanes which cannot be hot formed or bent.

These and other objects of the present invention are achieved by applying one or more layers of a tape material to the specific area of an article to a desired thickness, with the tape material including a mixture of a binder and an alloy powder, which is compatible with the substrate with the mixture formed into a flexible tape of uniform thickness and backed with an adhesive. After the tape is added, the article is heated to a temperature at which the adhesive and binder decompose and at which diffusion occurs between the alloy powder in the tape and the substrate alloy. By using layers of constant thickness tape, precise reclassification of the gas nozzle area can be made in a specific area prior to heating and without labor intensive welding or plasma spraying operations, and the reclassification can be performed concurrently with the repair of surface cracks. A final machining step blends the edges of the tape, yielding a smooth contoured surface.

BRIEF DESCRIPTION OF THE DRAWING

The FIGURE of the drawing is an illustration of the vane reclassification process of the present invention.

BEST MODE FOR CARRYING OUT THE INVENTION

Referring to the FIGURE, the reclassification method of the present invention is illustrated. A vane 1 includes a concave surface 2, a convex surface 3, a leading edge 4 and a trailing edge 5. The vane 1 is disposed between an upstream vane 6 and a downstream vane 7 with a nozzle area 8 defined between vanes 6 and 1 and a nozzle area 9 defined between vanes 1 and 7, with the nozzle areas measured at the narrowest spacing between two adjacent vanes, illustrated by lines 10, 11, 12 and 13.

For illustrative purposes, it is assumed that the vanes 1, 6 and 7 are used vanes which have been inspected and found to require reclassification of the nozzle area to achieve optimum turbine efficiency. For illustrative purposes, the vanes 1, 6 and 7 are composed of a cobalt base superalloy having a nominal composition of 23.4Cr, 10Ni, 7W, 3.5Ta, 0.2T, 0.6C, 0.5Zr and 1.5Fe. Vanes composed of such a material cannot be hot struck or bent without detrimentally altering the fatigue properties of the alloy. Therefore, either the vanes must be replaced or substrate alloy added to the vanes where deterioration occurred. While such an alloy is illustrative of the present invention, it will be understood by those skilled in the art that articles composed of other materials, such as iron or nickel base superalloys, could benefit from the method of the present invention.

Accordingly, reclassification is accomplished by adding successive layers of a tape material 14 to the deteriorated surface of the vane 1. The tape utilized comprises a mixture of an alloy powder and a binder, which is formed into a paste and spread into a uniform thickness sheet. The tape material may be produced using the teachings of U.S. Pat. No. 3,293,072 which is herein incorporated by reference. This patent shows how a tape may be produced using a removable carrier film as a substrate and employing an organic polymer such as polyvinyl alcohol or polymethacrylates along with a smaller amount of a volatile plasticizer such as sucrose-acetate isobutyrate, dibutylphthalate or diethyl-oxalate, for use with the polymethacrylate binders, and glycerine for use with the polyvinyl alcohol binders. The powder material is formed into a slurry with the binder, plasticizer and acetone, as solvent, applied in a thin layer to a removable backing and then heated to remove the solvent. The sheet of material is then cut into flexible strips and an adhesive backing added.

The alloy powder is the major component of the tape and is compatible with the substrate and capable of withstanding the operating environment, usually comprising a compatible braze or diffusion bondable alloy. For use with the cobalt base superalloy previously disclosed, the alloy powder comprises a mixture of 60% by weight of an alloy having a nominal composition of 24.5Cr, 40Ni, 3 B, balance cobalt and 40% by weight of the substrate alloy in powder form.

Referring to the FIGURE, the adhesively backed tape 14 is added in layers until the desired amount of alloy is achieved. Since the tape is thin and flexible, it is easy to tailor to the desired shape and thickness, conformable to irregular surfaces. The layers are pyramided to form a gradual rise in the alloy thickness in a specific area of the vane, thereby narrowing the spacing between the vanes. Between vanes 6 and 1, four layers of the tape are shown, while between vanes 1 and 7, two layers are shown. It will be understood by one skilled in the art that the tape may be applied to either or both sides of the vane, depending on the particular circumstances.

The vane 1 with the tape 14 applied is then heated to a temperature at which bonding will occur. At or below that temperature, the binder and adhesive backing decompose without leaving a substantial residue, thereby avoiding contamination of the alloy. The alloy powder in the tape then bonds with the substrate alloy, forming a continuous, void free microstructure. In a preferred embodiment, this bonding involves transient liquid phase bonding (TLP), as is described in U.S. Pat. Nos. 3,678,570, 4,005,988, and 4,073,639 herein incorporated by reference, providing a bond at a temperature at which the base alloy can be exposed without deleterious effect. During TLP bonding, the article is held at the bonding temperature until isothermal solidification is achieved. To produce a TLP bond, the tape alloy has the same basis metal as the superalloy vane, and includes a high boron content. The presence of boron, preferably 1–5% weight, acts as a melting point depressant, and thereby provides a melting point temperature below that of the superalloy and below that which would cause irreversible adverse metallurgical changes in the substrate alloy. After bonding, the vane is heat treated to provide homogenization of the microstructure between the tape alloy and the substrate alloy.

After bonding the tape to the vane, the surface is machined to achieve the proper surface countour. This generally requires blending the edges of the tape to provide a smooth aerodynamic surface.

EXAMPLE

A turbine vane, composed of a cobalt base superalloy, having a nominal composition of 23.4Cr, 10Ni, 7W, 3.5Ta, 0.2Ti, 0.6C, 0.5Zr and 1.5Fe, was removed and inspected after a number of hours of service in a gas turbine engine. The vane was grit blasted clean and had an aluminide coating chemically removed from the surfaces. The vane was then inspected with a fluorescent penetrant material, such as Zyglo TM, to locate cracks or other surface defects. After determining that the flaws were repairable, the nozzle area (class) was measured and recorded. It was determined that the nozzle area had increased and that a build up of material was required to return the vane to its original class.

The cobalt alloy vane was hydrogen cleaned in a hydrogen retort at 2100° F. for two and a half hours, then vacuum cleaned at 2100° F. for two hours.

A tape material was applied to the vane, having a uniform thickness of 0.020 inches and containing an alloy powder which was compatible with the substrate alloy and a binder, with the mixture formulated to provide TLP bonding, comprising a mixture of 60% by weight of an alloy having a nominal composition of 24.5Cr, 40Ni, 3 B, balance cobalt and 40% by weight of the substrate alloy in powder form. Four layers of the tape were cut to the appropriate shape and adhesively applied on one side of the vane and two layers were applied to the trailing edge. Each layer was varied in width to promote a smooth build up of the material on the surface of the vane. The vane was then heated to 2100° F. under vacuum and held for twelve hours. At this temperature, the binder and adhesive backing decompose leaving essentially no residue and the alloy powder melted, fused with and diffused into the substrate alloy, providing a unitary thickened surface, with the tape material concurrently filling any cracks in the reclassification area. Solidification occurred isothermally as the boron melt depressant diffused into the substrate alloy.

The build up of material was then blended using an abrasive belt grinder which tapered the edges of the tape to provide a continuous smooth surface. The vane was then grit blasted, fluorescent particle inspected and the nozzle area measured to confirm the proper reclassification. Any blocked air holes in the vane were reopened and the vane then recoated.

The coated vane was finally inspected and the vane classification rechecked. It should be noted that coating generally decreases the vane classification due to the added thickness of the coating material on the nozzle surface. This must be considered when determining the layers of tape to be applied.

Utilizing a tape reclassification process eliminates labor intensive welding operations and the thermal stress produced thereby. This process also provides controlled build up to a precise requirement and achieves a homogeneous substrate alloy configuration. While the preferred embodiment of the present invention has been described in relation to a turbine vane, it will be understood by those skilled in the art that any turbine engine component requiring a controlled addition of a substrate alloy to a specific area can benefit from this invention. While described in relation to a cobalt base superalloy, a temperature of 2100° F. and a time of twelve hours, it will be understood by those skilled in the art that other modifications in terms of time, temperature, alloy, tape thickness or width can be made without varying from the scope of the present invention.

Having thus described the invention what is claimed is:

1. A method for adding a controlled amount of alloy to a metal substrate alloy article in a specific area comprising:
   applying one or more layers of a tape material to the specific area to a desired thickness, the tape including a mixture of a binder and an alloy powder which is compatible with the substrate alloy, the mixture then formed into a uniform thickness tape which includes an adhesive backing; and,
   heating the article under vacuum to a temperature at which the adhesive and the binder decompose, and at which bonding occurs between the powdered alloy in the tape and the substrate alloy.

2. The method of claim 1 wherein said bonding comprises diffusion bonding.

3. The method of claim 1 further characterized by blending the tape alloy to provide a smooth contoured surface.

4. The method of claim 1 wherein said bonding comprises transient liquid phase bonding, with said tape alloy including between 1-5 weight percent boron.

5. The method of claim 4 further characterized by:
   holding the article at the bonding temperature until isothermal solidification occurs; and,
   heat treating the article to provide homogenization of the tape alloy and the substrate alloy.

6. A method for reclassifying the nozzle area between adjacent turbine vanes which include a substrate alloy, said method comprising:
   determining the excess in the nozzle area between the vanes,
   applying one or more layers of a tape material to the deficient area to a desired thickness, the tape including a mixture of a binder and an alloy powder which is similar to the substrate alloy, the mixture then formed into a uniform thickness tape which includes an adhesive backing;
   heating the vane to a temperature at which the adhesive and the binder decompose and at which bonding occurs between the alloy powder in the tape and the substrate alloy; and
   blending the added alloy material to achieve an essentially smooth surface.

7. The method of claim 6 wherein said vane and said tape are heated under vacuum.

8. The method of claim 6 wherein said bonding comprises diffusion bonding.

9. The method of claim 6 wherein said bonding comprises transient liquid phase bonding, with said tape alloy including between 1-5 weight percent boron.

10. The method of claim 9 further characterized by:
    holding the vane at the bonding temperature until isothermal solidification occurs; and,
    heat treating the vane to provide homogenization of the tape alloy and the substrate alloy.

* * * * *